United States Patent [19]

Gerstner et al.

[11] Patent Number: 5,037,682

[45] Date of Patent: Aug. 6, 1991

[54] DECORATIVE PRINTED PACKAGING MATERIAL AND A PROCESS FOR PRODUCING THE SAME

[75] Inventors: John D. Gerstner, Neenah, Wis.; Joseph P. Yock, Portage, Mich.

[73] Assignee: James River Paper Company, Inc., Norwalk, Conn.

[21] Appl. No.: 507,571

[22] Filed: Apr. 11, 1990

Related U.S. Application Data

[62] Division of Ser. No. 23,624, Mar. 9, 1987, Pat. No. 4,933,212.

[51] Int. Cl.[5] .................................................. B32B 3/02

[52] U.S. Cl. ...................................... 428/34.2; 428/76; 428/195; 428/204; 428/206; 428/209; 428/323; 428/457

[58] Field of Search ...................... 428/195, 34.2, 209, 428/204, 323, 457, 76, 206; 427/258

[56] References Cited

U.S. PATENT DOCUMENTS

| | | | |
|---|---|---|---|
| 4,375,989 | 3/1983 | Mäkinen | 106/300 |
| 4,521,492 | 6/1985 | Allen | 428/464 |
| 4,568,574 | 2/1986 | Allen | 427/404 |
| 4,933,120 | 6/1990 | D'Amato et al. | 427/258 |
| 4,933,212 | 6/1990 | Gerstner et al. | 427/258 |

*Primary Examiner*—Patrick J. Ryan
*Attorney, Agent, or Firm*—Finnegan, Henderson, Farabow, Garrett & Dunner

[57] ABSTRACT

The present invention relates to a partially light reflective and light refractive decorative printed packaging material having enhanced light reflectivity and a process for producing the decorative printed packaging material.

2 Claims, No Drawings

DECORATIVE PRINTED PACKAGING MATERIAL AND A PROCESS FOR PRODUCING THE SAME

This is a division of application Ser. No. 07/023,624, filed Mar. 9, 1987 now U.S. Pat. No. 4,933,212.

FIELD OF THE INVENTION

The present invention relates to a decorative printed packaging material and a process for producing the same. More particularly, the invention relates to a partially light reflective and light refractive packaging material which has a smoother printed coating and enhanced light reflectivity than do packaging materials of the prior art.

BACKGROUND OF THE INVENTION

In recent years manufacturers have been investing large amounts of money into the design of product packaging in an effort to attract more consumers to their products. A great amount of detailed consideration has been given to the color and graphics of the package to enhance the aesthetics of the product.

Foil laminated paper and metallized papers are popular labeling and packaging materials for gift wrappings, coverings and decorative uses. Metallized papers are less bulky and less expensive than foil laminated paper.

A method for forming metallized paper is disclosed in U.S. Pat. No. 3,463,659 to Dragoom et al. The method comprises applying a barrier coat to a web, supercalendering the coated web, applying a continuous top coat to the coated web, vacuum metallizing said top coat, and then print-priming the vacuum metallized surface to form an inexpensive glossy mettallized paper which is particularly useful in the decorative labeling and packaging fields.

U.S. Pat. No. 4,233,195 to Mills discloses metallic printing inks and a process for metallizing papers and plastics therewith. The process comprises preparing a metallic ink containing a leafing grade aluminum paste, applying the ink to a paper, paperboard or plastic film base by either the relief or intaglio printing processes, drying the ink to form a metallized coating on the base and then heat treating the coating at a temperature of about 300° F. to cause the aluminum particles to move to the surface to form a reflective coating.

U.S. Pat. Nos. 4,521,492 and 4,568,574 to Allen each disclose a light refractive coated paperboard which has the appearance of a colored foil laminated paperboard without employing foil which conceals, from the outer surface of a package made therefrom, oil and grease stains which have penetrated the inner surface of the package. The packaging material comprises a normally oil and/or grease permeable substrate material coated with a non-leafing silver-colored ink and a highly pigmented white ink layer. In some cases a transparent polymeric overlayer is superimposed upon the pigmented polymeric layer. The Allen patents further teach that if a foil-like appearance is desired, the highly pigmented white ink is first deposited on the substrate and thereafter the non-leafing silver colored ink is applied over the highly pigmented white ink layer.

A method of forming the packaging material is also provided by the Allen patents. The method comprises the steps of providing a substrate which is normally susceptible to permeation by oil or grease; printing on one surface of the substrate a first layer of one of a non-leafing metallic silver-colored ink and a highly pigmented white ink and printing directly onto the first layer a second layer of the other of the non-leafing metallic ink and the highly pigmented ink to mask the appearance of grease or oil stains which permeate the substrate from the opposite surface.

However, in many instances, it is undesirable to produce a packaging material which conceals grease and oil stains or which is foil like in appearance in its entirety.

SUMMARY OF THE INVENTION

The present invention advances the state of the art by providing a packaging material which contains light reflective portions which are foil like in appearance without the use of a foil laminate.

A feature of the invention is to produce a packaging material that simulates the appearance of foil lamination through the use of inks and without the use of foil.

Another feature of the invention is to provide a packaging material which contains within its design light reflective portions in an arrangement to achieve the desired decorative effect.

A further feature of the invention is to provide a packaging material which has an improved smooth printed surface and enhanced reflectivity.

Still another feature of the invention is to provide a process for producing the packaging material in an economical and simple manner.

Additional features and advantages of the invention will be set forth in the description that follows and in part will be apparent from the description or may be learned by practice of the invention. The features and advantages of the invention may be realized and obtained by means of the instrumentalities and combinations particularly pointed out in the appended claims.

To achieve these features and in accordance with the invention, there is provided a decorative printed packaging material comprising (1) a first layer formed of a paperboard substrate; (2) a second layer formed of a non-leafing metallic ink present in an amount to provide the desired decorative effect applied directly onto one surface of the paperboard substrate; (3) a high density white pigmented ink layer printed over the non-leafing metallic ink layer; (4) one or more colorant layers printed over the high density white pigmented ink layer to achieve the desired effect and (5) a transparent high gloss overlacquer layer applied over the colorant layer or layers.

There is also provided a process for producing the above-described decorative printed packaging material which comprises the steps of printing at a screen angle of 105° onto one surface of the paperboard substrate layer a second layer of a non-leafing metallic ink; printing at a screen angle of 15° directly onto the second layer a third layer of a high density white pigmented ink; printing directly onto the third layer a fourth layer of one or more colorants; and printing directly onto the fourth layer a fifth layer of a transparent high gloss overlacquer.

The present invention provides a packaging material which contains highly reflective portions within the package design to achieve the desired decorative effect and which has a smoother printed surface, enhanced reflectivity and improved machineability than prior art foil look alike packaging materials.

The present invention also provides a process for producing a decorative printing packaging material which is far less expensive than foil laminated look-alike packaging materials.

The foregoing and other features and advantages of the present invention will be made more apparent from the following description of a preferred embodiment.

DETAILED DESCRIPTION OF THE PREFERRED EMBODIMENTS

Reference will now be made to the preferred embodiments of the invention.

The present invention provides a decorative printed packaging material and a process for producing the same. The packaging material of the present invention comprises a substrate which is coated first with a non-leafing metallic ink layer, a high density pigmented white ink layer, which is applied over the metallic ink layer, one or more colorant layers which are printed over the high density white pigmented ink layer to achieve the desired decorative effect and a transparent high gloss overlacquer layer which is printed over the colorant layer or layers.

A suitable substrate is paperboard ranging in thickness from 0.012 to 0.035 inches, preferably with a thickness in the range of 0.016 to 0.026 inches.

While pretreatment of the substrate is not required in the practice of the present invention, most paperboard substrates which are used for packaging consumer products are calendered and clay coated to provide the smoothness necessary for good printing quality. Calendaring and clay coating are desirable in the process of the present invention to facilitate the continuity of the ink layer. Alternatively, the substrate may be solid bleached.

The metallic ink employed in the present invention must be of the non-leafing type. When a leafing metallic ink is used unsatisfactory adhesion of the ink to the substrate tends to exist. Preferably, the metallic ink is a dispersion of aluminum powder in a nitrocellulose resin containing as solvents esters and alcohols. An example of a suitable metallic ink composition is a bright aluminium powder in a nitrocellulose resin and plasticizers containing as solvents, esters and alcohols.

The non-leafing metallic ink is applied to the paperboard substrate by rotogravure printing using a conventional 100 line screen cylinder at a screen angle of about 105°.

Colorants such as blue, silver, rose, orange, gold or yellow inks or dyes may be printed over the metallic ink layer to produce the desired colored and/or metallic effect.

A high density white pigmented ink layer is applied over the non-leafing metallic layer. Preferably this layer contains a dispersion of zinc sulfite in a nitrocellulose resin containing as solvents esters and alcohols, such as Sunate "C", which is available from General Printing Ink Company. An example of a suitable high density white pigmented ink composition is zinc sulfite pigment in a nitrocellulose resin, containing plasticizers and as solvents, esters and alcohols. It has been found that when titanium dioxide is used in the white pigmented ink layer a great deal of abrasion to the printing cylinder tends to occur. However, the use of the preferred zinc sulfite results in reduced wear impact to the printing cylinder.

The high density white pigmented ink layer is applied to the non-leafing metallic ink layer by conventional rotogravure printing using a 100 line screen cylinder at a screen angle of about 15°. The phrase "high density" when used in connection with the white pigmented ink layer means that the white pigmented ink layer contains at least 40% by weight of pigment, e.g., zinc sulfite pigment. Colorant layer or layers can be printed over the white pigmented ink layer to achieve the desired color effects.

The high gloss overlacquer layer is then applied over the colorant layer or layers to provide a foil-like appearance.

Application of the above-mentioned layers at the prescribed screen angles is critical to achieving the advantages of the present invention. It has been found that the application of the non-leafing metallic layer at a screen angle of 105° and the high density white pigmented ink layer at a screen angle of 15° results in an improved printing smoothness and enhanced light reflectivity.

The decorative printed packaging materials of the present invention are particularly suitable for packaging of household products which are often used in the home in the original product packaging, such as facial tissues.

What is claimed is:

1. A decorative printed packaging material comprising a first layer, a second layer, a third layer, a fourth layer, and a fifth layer; said first layer formed of paperboard; said second layer formed of a nonuniform non-leafing metallic ink printed directly on one surface of said first layer; said third layer formed of a high density white pigmented ink printed directly on said second layer; said second and third layer applied so as to provide a smooth layer with enhanced light reflectivity; said fourth layer formed of a colorant printed directly on said third layer; and said fifth layer formed of transparent high gloss overlacquer printed directly on said fourth layer.

2. The decorative printed packaging material of claim 1 further containing between said fourth and fifth layers additional colorant layers to achieve a desired graphic design in said printed packaging material.

* * * * *